(12) United States Patent
Liu

(10) Patent No.: US 9,786,892 B2
(45) Date of Patent: Oct. 10, 2017

(54) BATTERY ASSEMBLY AND ELECTRONIC CIGARETTE USING THE SAME

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 570 days.

(21) Appl. No.: 14/504,300

(22) Filed: Oct. 1, 2014

(65) Prior Publication Data

US 2015/0047663 A1 Feb. 19, 2015

Related U.S. Application Data

(63) Continuation of application No. PCT/CN2013/081694, filed on Aug. 16, 2013.

(51) Int. Cl.
*H01M 2/20* (2006.01)
*A24F 47/00* (2006.01)
(Continued)

(52) U.S. Cl.
CPC .......... *H01M 2/204* (2013.01); *A24F 47/008* (2013.01); *H01M 2/022* (2013.01);
(Continued)

(58) Field of Classification Search
CPC ............................ A24F 47/00; H01M 2/022
See application file for complete search history.

(56) References Cited

U.S. PATENT DOCUMENTS

| 5,505,214 A * | 4/1996 | Collins ................. A24F 47/008 128/202.21 |
| 2006/0251964 A1* | 11/2006 | Zedell ................... H01M 10/46 429/176 |
| 2008/0257367 A1 | 10/2008 | Paterno et al. |

FOREIGN PATENT DOCUMENTS

| CN | 201079011 Y | 7/2008 |
| CN | 101869356 A | 10/2010 |

(Continued)

OTHER PUBLICATIONS

International Search Report dated Jun. 10, 2014 for Application No. PCT/CN2013/081694.

*Primary Examiner* — Jill Warden
*Assistant Examiner* — Matthew Krcha
(74) *Attorney, Agent, or Firm* — Tim Tingkang Xia, Esq.; Locke Lord LLP

(57) ABSTRACT

This present application relates to a battery assembly and an electronic cigarette. The battery assembly comprises a battery including a first battery electrode and a second battery electrode. The battery assembly further includes a first charging electrode and a second charging electrode electrically connected to the first battery electrode and the second battery electrode correspondingly, and the battery assembly defines a first insertion hole and a second insertion hole at positions corresponding to the first charging electrode and the second charging electrode respectively; the first charging electrode and the second charging electrode are electrically connected to an external charger to supply charging power to the battery. By implementing the battery assembly and the electronic cigarette, the electronic cigarette can be directly inserted into the external charger to be charged, and the battery assembly and the atomization assembly do not need to be separated from each other.

14 Claims, 13 Drawing Sheets

(51) Int. Cl.
*H01M 2/02* (2006.01)
*H01M 2/10* (2006.01)
*H01M 2/30* (2006.01)
*H01M 10/44* (2006.01)
*H01M 10/46* (2006.01)

(52) U.S. Cl.
CPC ........... *H01M 2/1055* (2013.01); *H01M 2/30* (2013.01); *H01M 10/44* (2013.01); *H01M 10/46* (2013.01); *H01M 2220/30* (2013.01)

(56) References Cited

FOREIGN PATENT DOCUMENTS

| | | |
|---|---|---|
| CN | 203424299 U | 2/2014 |
| CN | 203424301 U | 2/2014 |
| WO | 2008077271 A1 | 7/2008 |

* cited by examiner

BATTERY ASSEMBLY AND ELECTRONIC CIGARETTE USING THE SAME

CROSS-REFERENCE TO RELATED APPLICATION

This application is a continuation application of International Patent Application No. PCT/CN2013/081694, by Qiuming LIU, filed Aug. 16, 2013, which is hereby incorporated herein in its entirety by reference.

FIELD OF THE INVENTION

This present application relates to the field of electrical heating products, and more particularly to a battery assembly and an electronic cigarette using the same.

BACKGROUND OF THE INVENTION

An electronic cigarette is a substitute for a traditional cigarette. The electronic cigarette can simulate the taste of the traditional cigarette. However, when being smoked, the electronic cigarette does not generate materials which are harmful to human bodies, such as tar, nicotine, and second-hand smoke. Thus, the electronic cigarette can increase a smoking cessation success rate of nicotine replacement therapy. A conventional electronic cigarette generally comprises two parts, wherein one part is a battery assembly simulating a body of a traditional cigarette, and the battery assembly can include a control module, a battery circuit, and so on; the other part is an atomization assembly connected with the battery assembly, and the atomization assembly includes an oil storage body with pores, a cellucotton, and a heating wire.

In the prior art, electronic cigarettes are generally classified into two types, which are disposable electronic cigarettes and reusable electronic cigarettes. A disposable electronic cigarette generally does not have a charging function. Therefore, when the disposable electronic cigarette is used, smoke oil in the disposable electronic cigarette in most cases cannot be fully used up, which results in waste. FIG. 1 illustrates charging principle of a reusable electronic cigarette in the prior art. When a chargeable battery 110 in the reusable electronic cigarette is charged, because a charging port of the chargeable battery 110 is positioned at a junction between a battery assembly and an atomization assembly, the atomization assembly needs to be detached from the battery assembly in order to expose two charging terminals of the charging port. In this method, the battery 110 is unable to be charged unless the atomization assembly is detached from the battery assembly. Thus, the method may waste time and work, and is quite inconvenient to use. Especially, when a driver is driving a car, he/she is difficult to use one hand to operate a steering wheel and use the other hand to detach the atomization assembly from the battery assembly at the same time, which causes great inconvenience for smokers.

SUMMARY OF THE INVENTION

The object of the present application is to provide a battery assembly that is capable of being charged directly and an electronic cigarette using the same to solve the problem that electronic cigarettes in the prior art are inconvenient to be charged.

In order to realize the object mentioned above, in one aspect this present application relates to a battery assembly configured to be connected with an atomization assembly to form an electronic cigarette, the battery assembly comprises a battery, the battery includes a first battery electrode and a second battery electrode, the battery assembly further includes a first charging electrode electrically connected to the first battery electrode and a second charging electrode electrically connected to the second battery electrode, and the battery assembly defines a first insertion hole at a position corresponding to the first charging electrode and a second insertion hole at a position corresponding to the second charging electrode; the first charging electrode and the second charging electrode are configured to be electrically connected to an external charger to supply charging power to the battery.

In one embodiment, the battery assembly further includes an outer sleeve sheathed outside the battery, and the first insertion hole and the second insertion hole are through-holes defined in a side wall of the outer sleeve at intervals.

At least one of the first charging electrode and the second charging electrode extends into the first insertion hole or the second insertion hole correspondingly.

In another embodiment, at least one of the first charging electrode and the second charging electrode is sleeved in the first insertion hole or the second insertion hole correspondingly.

In another embodiment, at least one of the first charging electrode and the second charging electrode is positioned on an inner wall of the outer sleeve near the first insertion hole or an inner wall of the outer sleeve near the second insertion hole correspondingly.

In another embodiment, the battery assembly further includes an outer sleeve and an end cover covered on an end surface of the outer sleeve, and the first insertion hole and the second insertion hole are defined in the outer sleeve or the end cover.

The end cover includes a main body sleeved in the outer sleeve and a cover body covered on the end surface of the outer sleeve; and the first insertion hole and the second insertion hole are respectively defined in a side wall of the cover body near the main body.

In another embodiment, a size of a section of the first insertion hole is larger than a size of a section of the second insertion hole, and the first insertion hole and the second insertion hole are respectively positioned at symmetrical positions based on a central axis of the end cover.

An outer side wall of the main body forms a first slot extending along an axial direction of the main body and communicating with the first insertion hole, and a second slot extending along an axial direction of the main body and communicating with the second insertion hole; the first charging electrode is inserted in the first slot, and the second charging electrode is inserted in the second slot.

In another embodiment, the battery assembly further includes a control module; the control module is configured for controlling the battery to supply power to the atomization assembly to atomize smoke oil in the atomization assembly in a normal working status, and the control module is further configured for controlling the battery to stop supplying power to the atomization assembly in a charging status; and the control module includes a first electric line electrically connected with the first charging electrode and a first battery electrode terminal electrically connected with the first battery electrode.

A first line hole is defined in the first charging electrode, the first electric line is inserted in the first line hole, and the first charging electrode is electrically connected with the control module via the first electric line.

In another embodiment, a second line hole is defined in the second charging electrode, and the second battery electrode includes a second electric line inserted in the second line hole and configured for electrically connecting the second charging electrode with the second battery electrode.

In another aspect, an electronic cigarette comprises an atomization assembly and a batter assembly, the battery assembly comprises a battery, and the battery includes a first battery electrode and a second battery electrode; the battery assembly further includes a first charging electrode electrically connected to the first battery electrode and a second charging electrode electrically connected to the second battery electrode, the battery assembly defines a first inserted hole at a corresponding position to the first charging electrode and a second inserted hole at corresponding position to the second charging electrode; the first charging electrode and the second charging electrode are configured for electrically connected to an external charger, so that the battery is supplied with charging power.

In one embodiment, the battery assembly further includes an outer sleeve sheathed outside the battery, and the first insertion hole and the second insertion hole are through-holes defined in a side wall of the outer sleeve at intervals.

In another embodiment, the battery assembly further includes an outer sleeve and an end cover covered on an end surface of the outer sleeve, and the first insertion hole and the second insertion hole are defined in the outer sleeve or the end cover.

The end cover includes a main body sleeved in the outer sleeve and a cover body covered on the end surface of the outer sleeve; and the first insertion hole and the second insertion hole are respectively defined in a side wall of the cover body near the main body.

An outer side wall of the main body forms a first slot extending along an axial direction of the main body and communicating with the first insertion hole, and a second slot extending along an axial direction of the main body and communicating with the second insertion hole; the first charging electrode is inserted in the first slot, and the second charging electrode is inserted in the second slot.

In another embodiment, a size of a section of the first insertion hole is larger than a size of a section of the second insertion hole, and the first insertion hole and the second insertion hole are respectively positioned at symmetrical positions based on a central axis of the end cover.

In another embodiment, the battery assembly further includes a control module; the control module is configured for controlling the battery to supply power to the atomization assembly to atomize smoke oil in the atomization assembly in a normal working status, and the control module is further configured for controlling the battery to stop supplying power to the atomization assembly in a charging status; and the control module includes a first electric line electrically connected with the first charging electrode and a first battery electrode terminal electrically connected with the first battery electrode.

a first line hole is defined in the first charging electrode, the first electric line is inserted in the first line hole, and the first charging electrode is electrically connected with the control module via the first electric line; a second line hole is defined in the second charging electrode, and the second battery electrode includes a second electric line inserted in the second line hole and configured for electrically connecting the second charging electrode with the second battery electrode.

By implementing the battery assembly and the electronic cigarette of the present application, the following advantages can be achieved: when the battery assembly or the electronic cigarette of the present application needs to be charged, the battery assembly or the electronic cigarette can be directly inserted into an external charger and then be rotated. In this way, two electrodes of the external charger can be respectively inserted into the first insertion hole and the second insertion hole, so that a charging process of the battery in the battery assembly or the electronic cigarette can be achieved. Compared with the prior art, the electronic cigarette of the present application can be directly inserted into the external charger to be charged, which is convenient for users to use and saves time. Furthermore, the battery assembly and the atomization assembly do not need to be separated from each other, which prevents a case that the atomization assembly is placed elsewhere and is prone to be lost in the charging process, and improves the users' experience.

DETAILED DESCRIPTION OF THE PREFERRED EMBODIMENT

Figure 1:
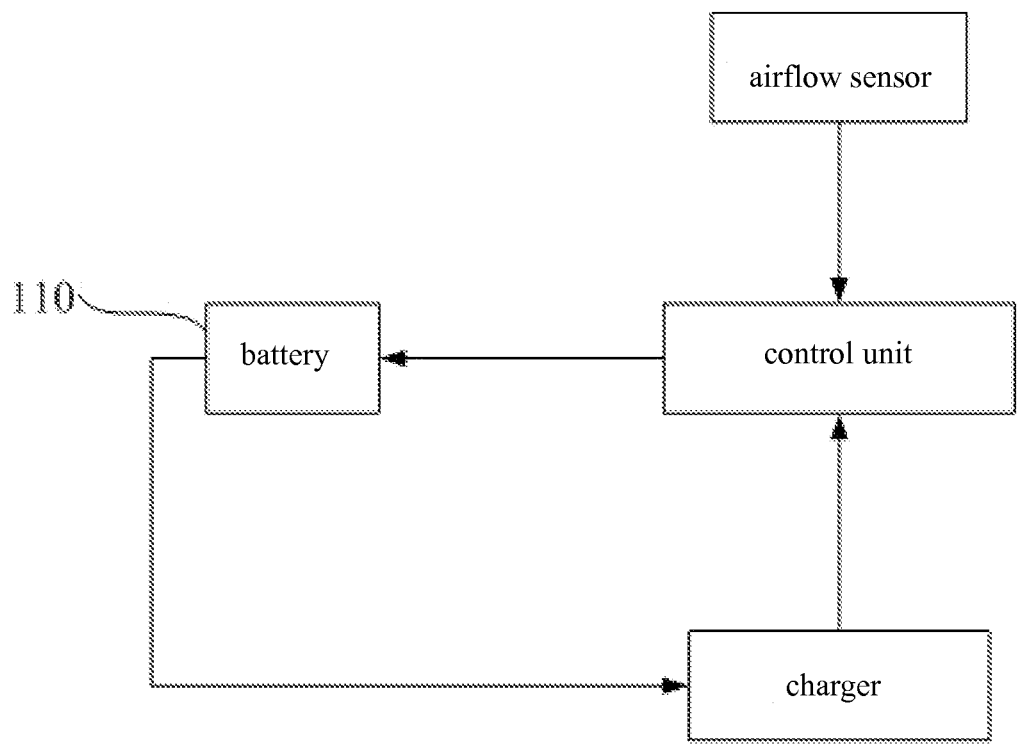
FIG. 1 is a block diagram of charging principle of a battery assembly of an electronic cigarette in the prior art.
Figure 2:
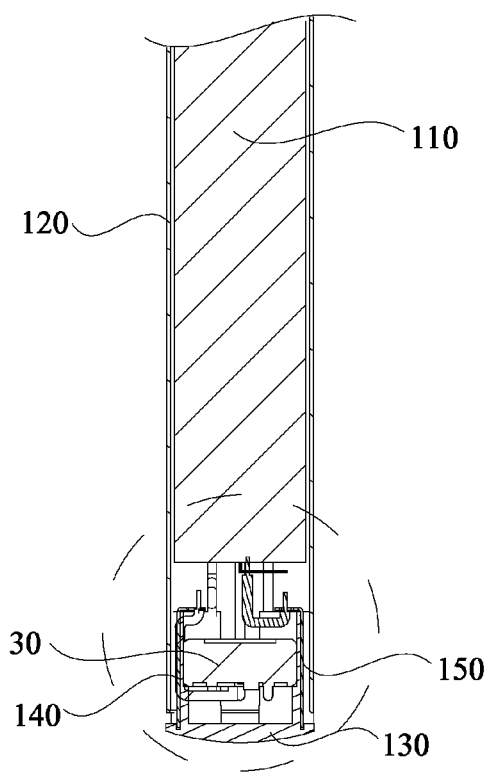
FIG. 2 is a cut-away view of a battery assembly of an electronic cigarette of a first embodiment of the present application.
Figure 3:
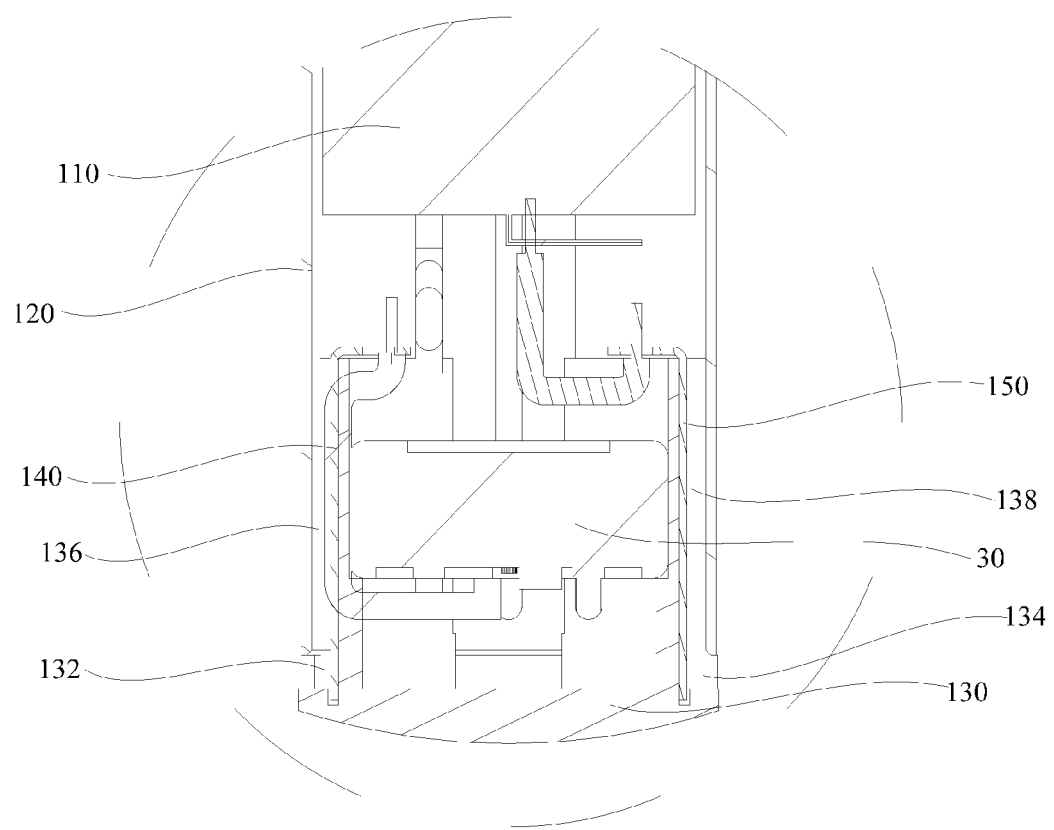
FIG. 3 is an enlarged view of the Part A shown in FIG. 2.

In order to understand the technical features, the purpose and the effect of the present application more clearly, the specific embodiments of the present application will be described in detail referring to the drawings.

Referring to FIGS. 2-5, a battery assembly provided by a preferred embodiment of the present application is configured to be connected with an atomization assembly 20 to form an electronic cigarette. The battery assembly includes an outer sleeve 120, a battery 110, an end cover 130, a control module 30, a first wire 60, a second wire 40, a third wire 50, a first charging electrode 140, a second charging electrode 150, a first battery electrode connecting member 160, and a second battery electrode connecting member 170. The battery 110, the control module 30, the first charging electrode 140, the second charging electrode 150, the first wire 60, the second wire 40, the third wire 50, the first battery electrode connecting member 160, and the second battery electrode connecting member 170 are all disposed in the outer sleeve 120. The end cover 130 is covered on the surface of one end of the outer sleeve 120, and both the first battery electrode connecting member 160 and the second battery electrode connecting member 170 are sleeved in another end of the outer sleeve 120. The end cover 130 is a lamp cap or a common sealed cover. In this embodiment, the end cover 130 is a lamp cap mounted on a side of a lamp (not shown in the drawings) electrically connected to the control module 30. When the atomization assembly 20 is in a working status, the lamp disposed at a side of the end cover 130 gives out light for imitating tobacco burning.

Figure 4:
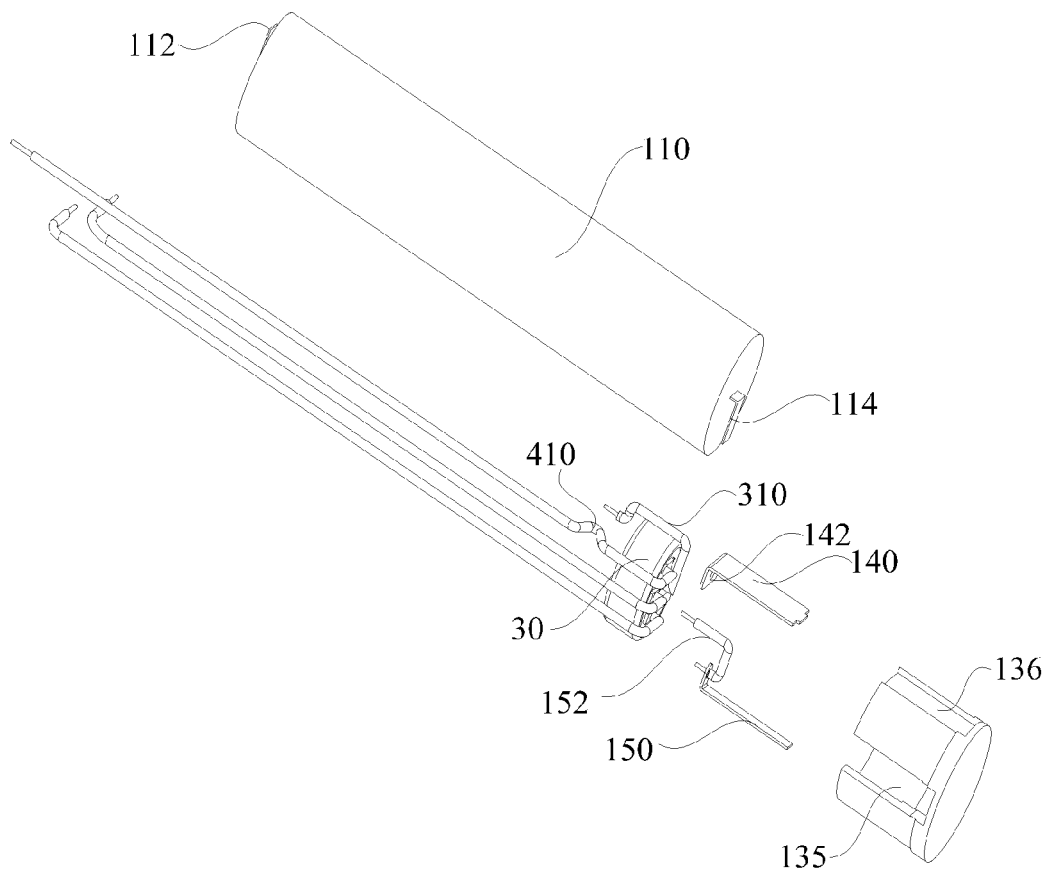
FIG. 4 is a structural schematic view of the battery assembly shown in FIG. 2.
Figure 5:
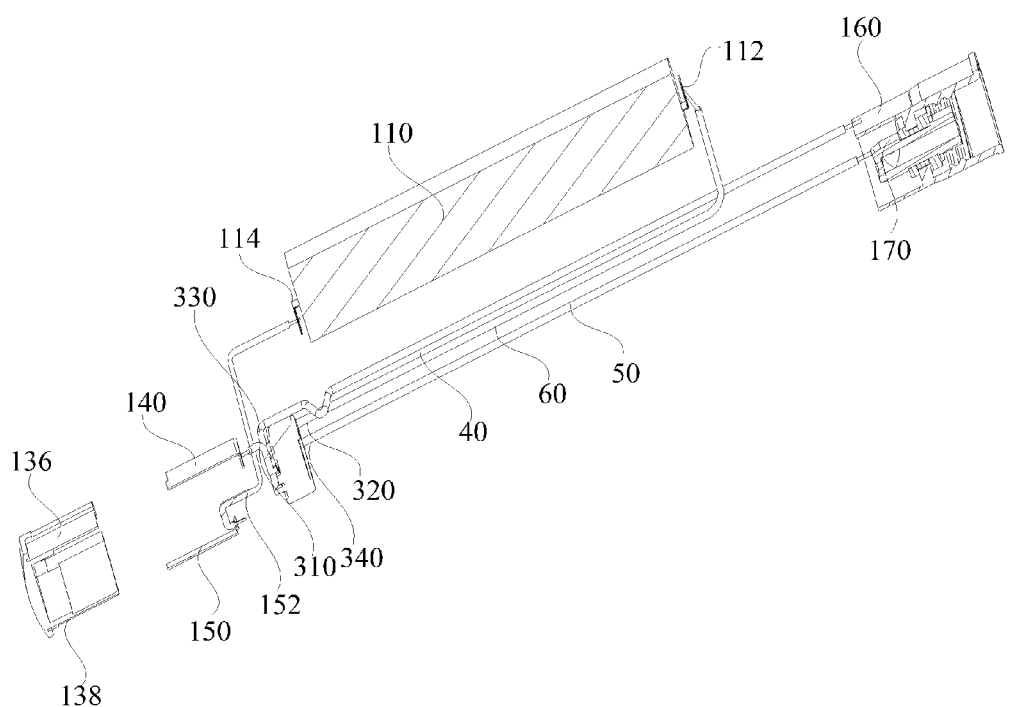
FIG. 5 is a cut-away view of the battery assembly shown in FIG. 4.

Referring to FIG. 4 and FIG. 5, the battery 110 is generally cylindrical and includes a first battery electrode 112 and a second battery electrode 114. The first battery electrode 112 and the second battery electrode 114 are formed on two opposite end surfaces of the battery 110 respectively. The battery 110 is sleeved in the outer sleeve 120, and the battery 110 can be a common chargeable battery. In this embodiment, the first battery electrode 112 is a positive electrode of the battery 110, and the second battery electrode 114 is a negative electrode of the battery 110. It is understandable that, in other embodiments, the first battery electrode 112 can be a negative electrode and the second battery electrode 114 can be a positive electrode.

Both the first charging electrode 140 and the second charging electrode 150 are plate-shaped structures, and are generally L-shaped. A size of the first charging electrode 140 is larger than a size of the second charging electrode 150. The first charging electrode 140 and the second charging electrode 150 are electrically connected with the first battery electrode 112 and the second battery electrode 114 respectively, so that the battery 110 can be charged. In this embodiment, the first charging electrode 140 is electrically connected with the first battery electrode 112, and the second charging electrode 150 is electrically connected with the second battery electrode 114. Thus, the first charging electrode 140 is a positive charging electrode and the second charging electrode 150 is a negative charging electrode. In other embodiments, the first charging electrode 140 can be electrically connected with the second battery electrode 114, and the second charging electrode 150 can be electrically connected with the first battery electrode 112. A side of the first charging electrode 140 near the control module 30 and a side of the second charging electrode 150 near the control module 30 define line holes respectively. Particularly, the first charging electrode 140 defines a first line hole 142, and the second charging electrode 150 defines a second line hole (not labeled). The second line hole receives a second electric line 152 configured for electrically connecting the second charging electrode 150 with the second battery electrode 114. That is, one end of the second electric line 152 is inserted in the second line hole, and the other end of the second electric line 152 is welded on the second battery electrode 114, so that the second charging electrode 150 is electrically connected with the second battery electrode 114.

The control module 30 is disposed in the battery assembly for controlling the battery 110 to supply power to the atomization assembly 20 to atomize smoke oil in the atomization assembly 20 in a normal working status. When the battery 110 needs to be charged, the control module 30 is further configured for controlling the battery 110 to stop supplying power to the atomization assembly 20. Particularly, the control module 30 is sleeved in the end cover 130. The control module 30 includes a first electrode terminal 320, a second electrode terminal 330, a third electrode terminal 340, and a first electric line 310. An end of the first electric line 310 is inserted in the first line hole 142, so that the first charging electrode 140 is electrically connected with the control module 30. In this embodiment, when the battery 110 is charged, the first electric line 310 acts as an input electric line, and the second electric line 152 acts as an output electric line. One end of the first wire 60 is welded on the first electrode terminal 320, and the other end of the first wire 60 is welded on the first battery electrode 112, so that the first electrode terminal 320 is electrically connected with the first battery electrode 112. A portion of the second wire 40 near the second battery electrode 114 forms a bending portion 410, and the bending portion 410 is generally V-shaped. One end of the second wire 40 is welded on the second electrode terminal 330, the other end of the second wire 40 is welded on the first battery electrode connecting member 160, and the bending portion 410 is welded on the second battery electrode 114, so that both the second electrode terminal 330 and the first battery electrode connecting member 160 are electrically connected with the second battery electrode 114. One end of the third wire 50 is welded on the third electrode terminal 340, and the other end of the third wire 50 is welded on the second battery electrode connecting member 170, so that the third electrode terminal 340 is electrically connected with the second battery electrode connecting member 170.

Referring to FIG. 5, both the first battery electrode connecting member 160 and the second battery electrode connecting member 170 are positioned at an end of the outer sleeve 120 near the atomization assembly 20, and the first battery electrode connecting member 160 and the second battery electrode connecting member 170 are configured for transmitting power for driving the atomization assembly 20 to work.

Figure 6:
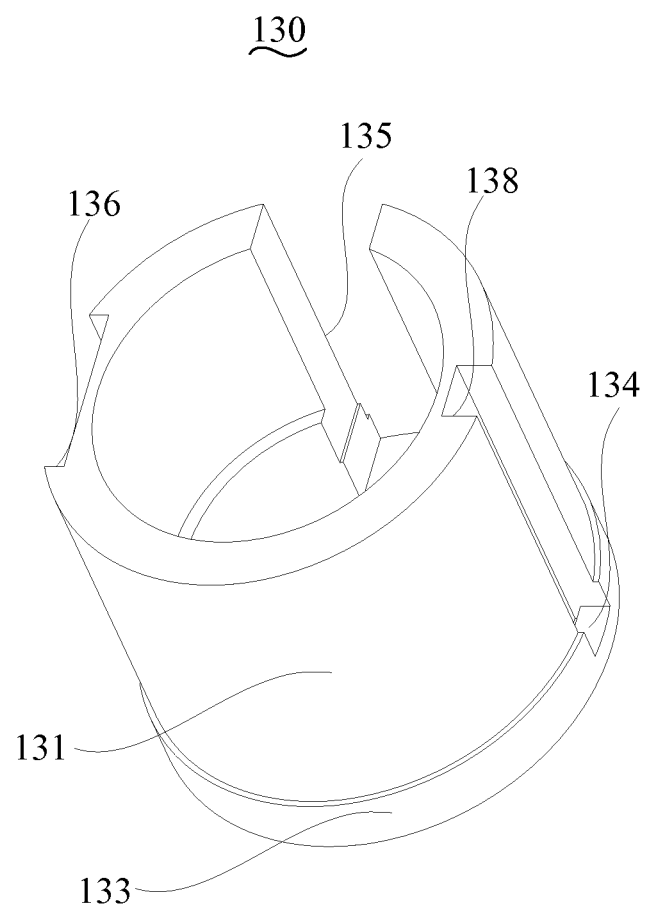
FIG. 6 is a structural schematic view of an end cover shown in FIG. 2.

Referring to FIG. 6, the end cover 130 is substantially a cylinder with an opening end, and is covered on an end surface of the outer sleeve 120 that is far away from the atomization assembly 20. The end cover 130 includes a main body 131 and a cover body 133; the main body 131 is sleeved in the outer sleeve 120, and the cover body 133 is covered on the end surface of the outer sleeve 120 to seal the end surface of the outer sleeve 120. A side wall of the cover body 133 near the main body 131 defines a first insertion hole 132 corresponding to the first charging electrode 140 and a second insertion hole 134 corresponding to the second charging electrode 150, and the first insertion hole 132 and the second insertion hole 134 are respectively positioned at symmetrical positions based on a central axis of the end cover 130. The first insertion hole 132 and the second insertion hole 134 are configured for enabling an external charger to insert, so that the external charger is electrically connected with the first charging electrode 140 and the second charging electrode 150 respectively and supplies charging power to the battery 110. In this embodiment, both the first insertion hole 132 and the second insertion hole 134 are square-shaped. It is understandable that the first insertion hole 132 and the second insertion hole 134 can also be round-shaped or in other shapes. The first insertion hole 132 and the second insertion hole 134 are inlets configured for enabling two electrodes of the external charger to insert respectively, so that the battery 110 is charged. A size of a section of the first insertion hole 132 is larger than a size of a section of the second insertion hole 134, so that users can conveniently distinguish whether one electrode of the external charger corresponds to the first insertion hole 132 or the second insertion hole 134. In this embodiment, the first insertion hole 132 corresponds to a positive electrode of the battery 110, and the second insertion hole 134 corresponds to a negative electrode of the battery 110. In other embodiments, a side wall of the battery assembly near the first insertion hole 132 and a side wall of the battery assembly near the second inserted hole 134 can be marked with identifiers configured for identifying the two electrodes of the battery 110 respectively. For example, a side wall of the battery assembly near the first insertion hole 132 can be marked with "+", and another side wall of the battery assembly near the second insertion hole 134 can be marked with "−". Thus, the identifiers "+" and "−" can facilitate users to identify the first insertion hole 132 and the second insertion hole 134, and insert the positive electrode and the negative electrode of the external charger into the first insertion hole 132 and the second insertion hole 134 correctly. In this way, the situation that the first charging electrode 140 and the second charging electrode 150 are reversely connected with the external charger, which may damage the battery assembly, can be avoided.

An outer side wall of the main body 131 forms a first slot 136 extending along an axial direction of the main body 131 and communicating with the first insertion hole 132, and a second slot 138 extending along an axial direction of the main body 131 and communicating with the second insertion hole 138. The first slot 136 is configured for accommodating the first charging electrode 140, and the second slot 138 is configured for accommodating the second charging electrode 150. Particularly, a size of the first slot 136 is adapted to the first charging electrode 140, and a size of the second slot 138 is adapted to the second charging electrode 150, so that the first charging electrode 140 is inserted and fixed in the first slot 136 and the second charging electrode 150 is inserted and fixed in the second slot 138. It is understandable that both the first slot 136 and the second slot 138 can be generally U-shaped, and the size of the first slot 136 is larger than the size of the second slot 138.

In this embodiment, the first insertion hole 132 communicates with the first slot 136, and the second insertion hole 134 communicates with the second slot 138. When the first charging electrode 140 is inserted in the first slot 136, the first charging electrode 140 extends into the first insertion hole 132; and when the second charging electrode 150 is inserted in the second slot 138, the second charging electrode 150 extends into the second insertion hole 134. Thus, when the battery assembly needs to be charged, two electrodes of an external charger only need to be respectively inserted in the first insertion hole 132 and the second insertion hole 134. In this way, the two electrodes of the external charger can be electrically connected with the first charging electrode 140 and the second charging electrode 150 respectively, so that a charging process for the battery 110 can be started.

The control module 30 is sleeved in the main body 131. The main body 131 defines a gap 135, and the gap 135 runs through the whole side wall of the main body 131. The gap 135 is configured for partially receiving the first wire 60, the second wire 40, and the third wire 50, that is, each of the first wire 60, the second wire 40 and the third wire 50 runs through the gap 135 to be connected with other components of the battery assembly.

In the battery assembly of this embodiment, the first insertion hole 132 and the second insertion hole 134 are defined in a side wall of the cover body 133, and are different in sizes. The size of the first insertion hole 132 is larger than the size of the second insertion hole 134. The first charging electrode 140 extends into the first insertion hole 132, and the second charging electrode 150 extends into the second insertion hole 134. When the battery assembly needs to be charged, two electrodes of an external charger merely need to be inserted in the first insertion hole 132 and the second insertion hole 134 respectively. When the two electrodes of the external charger are inserted in the first insertion hole 132 and the second insertion hole 134 respectively and contact the first charging electrode 140 and the second charging electrode 150 respectively, because the first charging electrode 140 is electrically connected to the first battery electrode 112 of the battery 110 and the second charging electrode 150 is electrically connected to the second battery electrode 114 of the battery 110, the external charger can start the charging process for the battery 110. After the battery 110 is fully charged, the external charger can be directly pulled out. The objective of defining the insertion holes in different sizes is to ensure that the positive electrode and the negative electrode of the external charger can be electrically connected with the positive electrode and the negative electrode of the battery 110 correctly. That is, the positive electrode of the external charger is ensured to be electrically connected with the positive electrode of the battery 110 and the negative electrode of the external charger is ensured to be electrically connected with the negative electrode of the battery 110. Thus, the situation that the electrodes of the external charger are reversely connected with the electrodes of the battery 110, which may cause short-circuit, can be avoided. In this way, service lives of the battery assembly and the external charger can be extended, and the users' experience can be improved.

Figure 7:
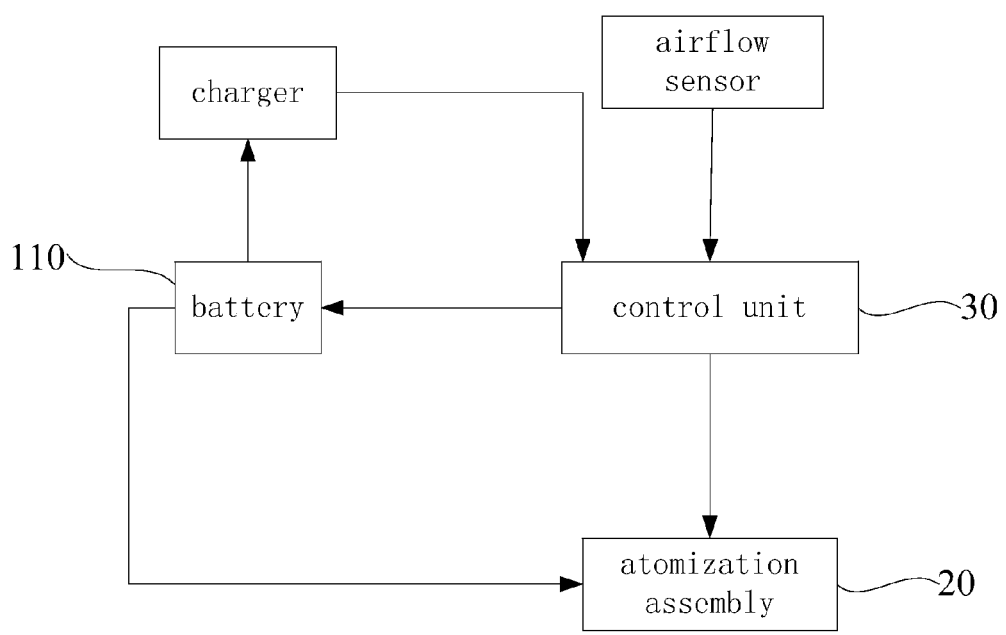
FIG. 7 is a block diagram of charging principle of the electronic cigarette shown in FIG. 2.

Referring to FIG. 7, when the battery assembly of the present application is working normally, the control module 30 controls the battery 110 to supply power to the atomization assembly 20 according to a signal provided by an airflow sensor, so that smoke oil in the atomization assembly 20 is atomized. That is, the atomization assembly 20 is in a working status. When the battery 110 needs to be charged, a charging terminal of an external charger is connected to the control module 30 via the first charging electrode 140 and the second charging electrode 150, and the control module 30 controls the external charger to supply power to the battery 110. Meanwhile, the atomization assembly 20 still keeps mechanically connecting with the battery assembly. However, the control module 30 controls the battery assembly to stop supplying power to atomization assembly 20, and thus the atomization assembly 20 is unable to work.

When the battery assembly of the present application needs to be charged, the battery assembly can be directly inserted in an external charger and then be rotated. In this way, two electrodes of the external charger can be respectively inserted in the first insertion hole 132 and the second insertion hole 134, and the charging process for the battery 110 can be started. The operation of the charging process is convenient and simple, and saves charging time.

In other embodiments, the first insertion hole 132 and the second insertion hole 134 can also be defined in the outer sleeve 120 at intervals. In this situation, the first insertion hole 132 and the second insertion hole 134 are through-holes defined in a side wall of the outer sleeve 120. A size of the first insertion hole 132 is different from a size of the second insertion hole 134, so that it is convenient to insert the positive electrode and the negative electrode of the external charger into the first insertion hole 132 and the second insertion hole 134 correctly, which can prevent occurrence of short-circuit case.

Figure 8:
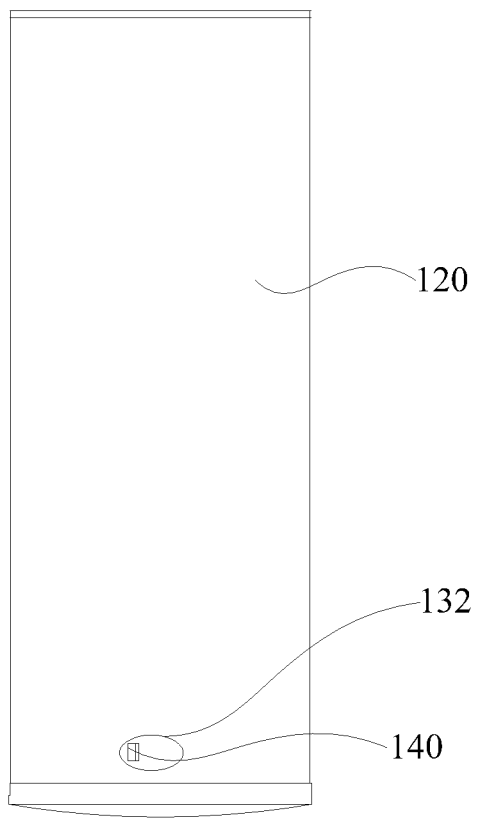
FIG. 8 is a structural schematic view of a battery assembly of a second embodiment of the present application.

Referring to FIG. 8, in a battery assembly provided by a second embodiment of the present application, the first insertion hole 132 and the second insertion hole 134 are through-holes defined in a side wall of the outer sleeve 120 at intervals. At least one of the first charging electrode 140 and the second charging electrode 150 extends into the first insertion hole 132 or the second insertion hole 134 correspondingly, that is, the first charging electrode 140 extends into the first insertion hole 132 and/or the second charging electrode 150 extends into the second insertion hole 134. In this embodiment, the first charging electrode 140 extends into the first insertion hole 132, and the other charging electrode (i.e., the second charging electrode 150) can extend into the second insertion hole 134 or not, as long as the first charging electrode 140 and the second charging electrode 150 can be electrically connected with two charging terminals of an external charger to charge the battery 110 when the two charging terminals of the external charger are inserted in the first insertion hole 132 and the second insertion hole 134 respectively.

Figure 9:
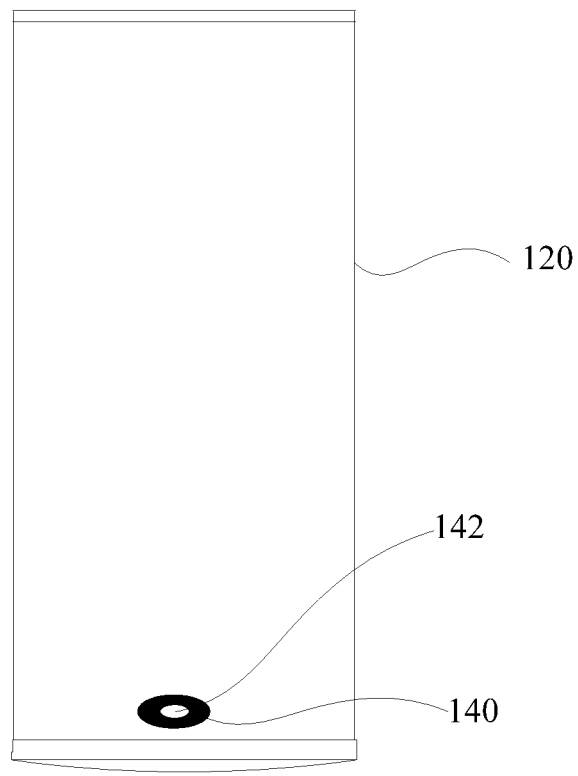
FIG. 9 is a structural schematic view of a battery assembly of a third embodiment of the present application.

Referring to FIG. 9, in a battery assembly provided by a third embodiment of the present application, the first insertion hole 132 and the second insertion hole 134 are through-holes defined in a side wall of the outer sleeve 120 at intervals. At least one of the first charging electrode 140 and the second charging electrode 150 is sleeved in the first insertion hole 132 or the second insertion hole 134 correspondingly, that is, the first charging electrode 140 is sleeved in the first insertion hole 132 and/or the second charging electrode 150 is sleeved in the second insertion hole 134. In this embodiment, the first charging electrode 140 is a hollow ring-shaped structure. The first charging electrode 140 contacts a side wall of the first insertion hole 132 and is sleeved in the first insertion hole 132, and the hollow structure of the first charging electrode 140 forms a mounting hole 142 configured for enabling charging terminals of external chargers to insert. When the battery 110 needs to be charged, one charging terminal of an external charger is inserted in the mounting hole 142, so that the charging terminal of the external charger is electrically connected with the first charging electrode 140. The other charging electrode (i.e., the second charging electrode 150) can be sleeved in the second insertion hole 134 or not, as long as the first charging electrode 140 and the second charging electrode 150 can be electrically connected with the two charging terminals of the external charger to charge the battery 110 when the two charging terminals of the external charger are inserted in the first insertion hole 132 and the second insertion hole 134 respectively.

In another embodiment of the present application, the first insertion hole 132 and the second insertion hole 134 are through-holes defined in a side wall of the outer sleeve 120 at intervals. At least one of the first charging electrode 140 and the second charging electrode 150 is positioned on an inner wall of the outer sleeve 120 near the first insertion hole 132 or an inner wall of the outer sleeve 120 near the second insertion hole 134 correspondingly. That is, the first charging electrode 140 is positioned on an inner wall of the outer sleeve 120 near the first insertion hole 132 and/or the second charging electrode 150 is positioned on an inner wall of the outer sleeve 120 near the second insertion hole 134. In this embodiment, the first charging electrode 140 is positioned on an inner wall of the outer sleeve 120 near the first insertion hole 132. Correspondingly, one charging terminal of an external charger needs to run through the first insertion hole 132 and then be inserted into the hollow structure in the outer sleeve 120 to be electrically connected with the first charging electrode 140. Thus, it can be seen that the charging terminal of the external charger configured for being electrically connected with the first charging electrode 140 needs to include a bending portion, so that the charging terminal can run through the first insertion hole 132 and then be electrically connected with the first charging electrode 140 to charge the battery 110. The other charging electrode (i.e., the second charging electrode 150) can be positioned on an inner wall of the outer sleeve 120 near the second insertion hole 134 or not. For example, the second charging electrode 150 can extend into the second insertion hole 134 or be sleeved in the second insertion hole 134, as long as the first charging electrode 140 and the second charging electrode 150 can be electrically connected with the two charging terminals of the external charger to charge the battery 110 when the two charging terminals of the external charger are inserted in the first insertion hole 132 and the second insertion hole 134 respectively.

Figure 10:
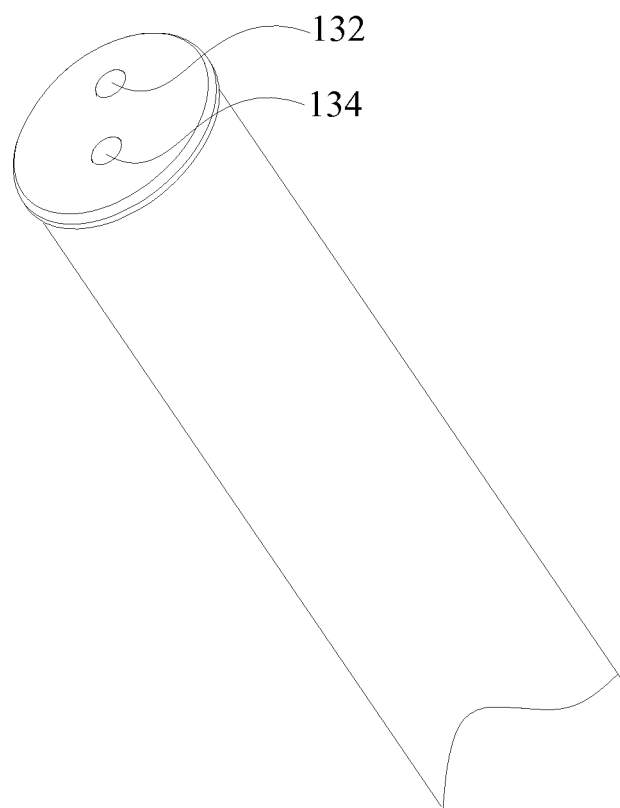
FIG. 10 is a structural schematic view of a battery assembly of a fourth embodiment of the present application.
Figure 11:
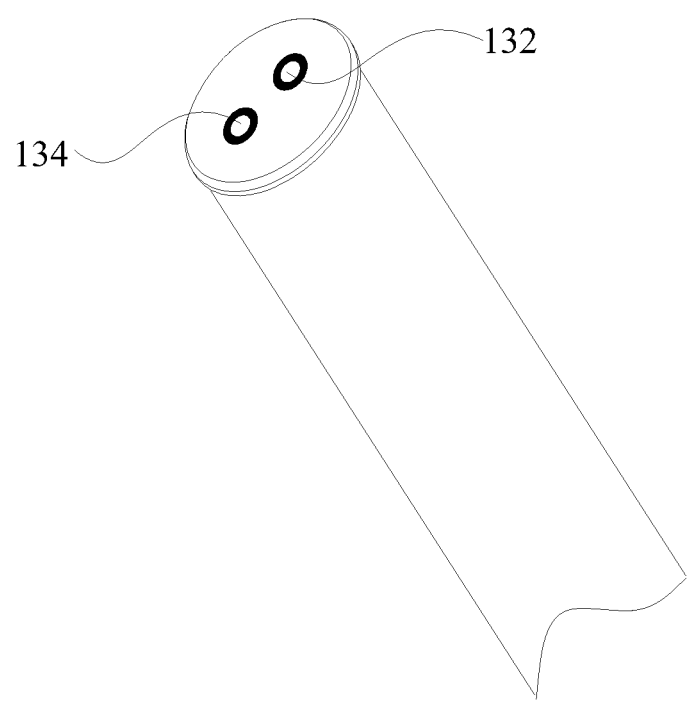
FIG. 11 is a structural schematic view of a battery assembly of a fifth embodiment of the present application.

Referring to FIG. 10 and FIG. 11, in another embodiment of the present application, the first insertion hole 132 and the second insertion hole 134 can also be defined in an end surface of the battery assembly that is far away from the atomization assembly 20. The end surface can be an end surface of the end cover 130 or an end surface of the outer sleeve 120, as long as the first charging electrode 140 and the second charging electrode 150 can be electrically connected with an external charger to charge the battery 110 when charging terminals of the external charger are inserted in the first insertion hole 132 and the second insertion hole 134 respectively.

Figure 12:
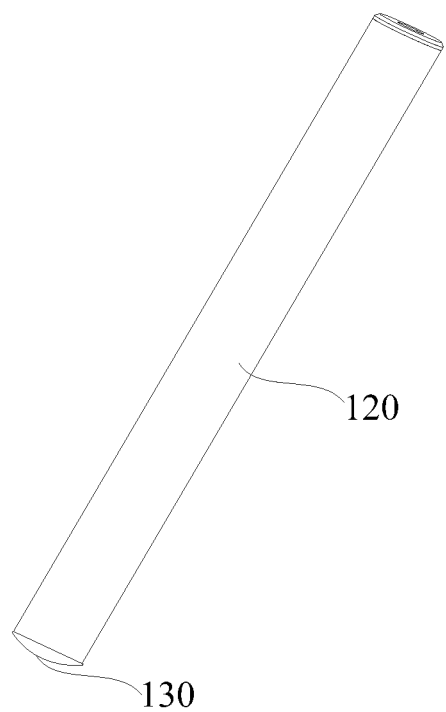
FIG. 12 is a structural schematic view of the electronic cigarette of the first embodiment of the present application.

Referring to FIG. 12, based on a structure of the aforementioned battery assembly, the present application further provides an electronic cigarette according to a first embodiment. The electronic cigarette comprises a battery assembly provided by any one of the aforementioned embodiments and an atomization assembly 20 received in the outer sleeve 120. The electronic cigarette of this application can be a disposable electronic cigarette.

Figure 13:
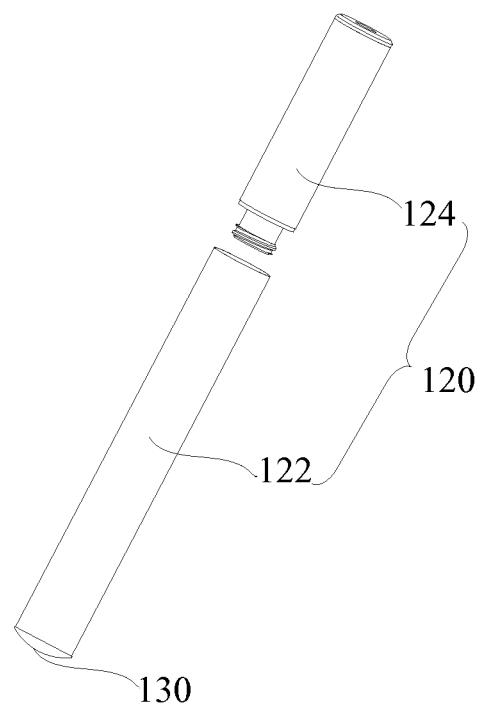
FIG. 13 is a structural schematic view of the electronic cigarette of the second embodiment of the present application.

Referring to FIG. 13, the present application further provides an electronic cigarette according to a second embodiment. A structure of the outer sleeve 120 of the electronic cigarette of the second embodiment is different from a structure of the outer sleeve 120 of the electronic cigarette of the first embodiment. In this embodiment, the outer sleeve 120 includes a battery sleeve 122 and an atomization sleeve 124 detachably connected with the battery sleeve 122. The battery sleeve 122 and the atomization sleeve 124 are connected with each other by a threaded connection method. The battery 110 is received in the battery sleeve 122, and the end cover 130 is mounted on an end of the battery sleeve 122 that is far away from the atomization sleeve 124. The atomization assembly 20 is received in the atomization sleeve 124. In other embodiments of the present application, the method for connecting the battery sleeve 122 with the atomization sleeve 124 can also be other detachable connection methods, such as a buckle connection method.

When the electronic cigarette of the present application is charged, the battery assembly and the atomization assembly 20 do not need to be separated from each other, which ensures reliable connection between the battery assembly and the atomization assembly 20 and brings great convenience to the users.

The present application has been described with the drawings to the embodiments, while the present application is not limit to the aforementioned specific embodiments and the specific embodiments are merely a hint rather than a limit. It will be understood by those skilled in the art that various changes may be made and equivalents may be substituted without departing from the purpose of the application and the scope of the claims, but all the changes will be included within the scope of the appended claims.

What is claimed is:

1. A battery assembly configured to be connected with an atomization assembly to form an electronic cigarette, comprising a battery, the battery including a first battery electrode and a second battery electrode; wherein, the battery assembly further includes a first charging electrode electrically connected to the first battery electrode and a second charging electrode electrically connected to the second battery electrode, and the battery assembly defines a first insertion hole at a position corresponding to the first charging electrode and a second insertion hole at a position corresponding to the second charging electrode; the first charging electrode and the second charging electrode are configured to be electrically connected to an external charger to supply charging power to the battery;
wherein, the battery assembly further includes an outer sleeve and an end cover covered on an end surface of the outer sleeve, and the first insertion hole and the second insertion hole are defined in the outer sleeve or the end cover,
wherein, the end cover includes a main body sleeved in the outer sleeve and a cover body covered on the end surface of the outer sleeve; and the first insertion hole and the second insertion hole are respectively defined in a side wall of the cover body near the main body, and
wherein, an outer side wall of the main body forms a first slot extending along an axial direction of the main body and communicating with the first insertion hole, and a second slot extending along an axial direction of the main body and communicating with the second insertion hole; the first charging electrode is inserted in the first slot, and the second charging electrode is inserted in the second slot.

2. The battery assembly of claim 1, wherein, the battery assembly further includes an outer sleeve sheathed outside the battery, and the first insertion hole and the second insertion hole are through-holes defined in a side wall of the outer sleeve at intervals.

3. The battery assembly of claim 2, wherein, at least one of the first charging electrode and the second charging electrode extends into the first insertion hole or the second insertion hole correspondingly.

4. The battery assembly of claim 2, wherein, at least one of the first charging electrode and the second charging electrode is sleeved in the first insertion hole or the second insertion hole correspondingly.

5. The battery assembly of claim 2, wherein, at least one of the first charging electrode and the second charging electrode is positioned on an inner wall of the outer sleeve near the first insertion hole or an inner wall of the outer sleeve near the second insertion hole correspondingly.

6. The battery assembly of claim 1, wherein, a size of a section of the first insertion hole is larger than a size of a section of the second insertion hole, and the first insertion hole and the second insertion hole are respectively positioned at symmetrical positions based on a central axis of the end cover.

7. The battery assembly of claim 1, wherein, the battery assembly further includes a control module; the control module is configured for controlling the battery to supply power to the atomization assembly to atomize smoke oil in the atomization assembly in a normal working status, and the control module is further configured for controlling the battery to stop supplying power to the atomization assembly in a charging status; and the control module includes a first electric line electrically connected with the first charging electrode and a first battery electrode terminal electrically connected with the first battery electrode.

8. The battery assembly of claim 7, wherein, a first line hole is defined in the first charging electrode, the first electric line is inserted in the first line hole, and the first charging electrode is electrically connected with the control module via the first electric line.

9. The battery assembly of claim 7, wherein, a second line hole is defined in the second charging electrode, and the second battery electrode includes a second electric line inserted in the second line hole and configured for electrically connecting the second charging electrode with the second battery electrode.

10. An electronic cigarette comprising an atomization assembly and a battery assembly, the battery assembly comprising a battery, and the battery including a first battery electrode and a second battery electrode; wherein, the battery assembly further includes a first charging electrode electrically connected to the first battery electrode and a second charging electrode electrically connected to the second battery electrode, the battery assembly defines a first insertion hole at a corresponding position to the first charging electrode and a second insertion hole at a corresponding position to the second charging electrode; the first charging electrode and the second charging electrode are configured to be electrically connected to an external charger to supply charging power to the battery;
wherein, the battery assembly further includes an outer sleeve and an end cover covered on an end surface of the outer sleeve, and the first insertion hole and the second insertion hole are defined in the outer sleeve or the end cover,
wherein, the end cover includes a main body sleeved in the outer sleeve and a cover body covered on the end surface of the outer sleeve; and the first insertion hole and the second insertion hole are respectively defined in a side wall of the cover body near the main body, and
wherein, an outer side wall of the main body forms a first slot extending along an axial direction of the main body and communicating with the first insertion hole, and a second slot extending along an axial direction of the main body and communicating with the second insertion hole; the first charging electrode is inserted in the first slot, and the second charging electrode is inserted in the second slot.

11. The electronic cigarette of claim 10, wherein, the battery assembly further includes an outer sleeve sheathed outside the battery, and the first insertion hole and the second insertion hole are through-holes defined in a side wall of the outer sleeve at intervals.

12. The electronic cigarette of claim 10, wherein, a size of a section of the first insertion hole is larger than a size of a section of the second insertion hole, and the first insertion hole and the second insertion hole are respectively positioned at symmetrical positions based on a central axis of the end cover.

13. The electronic cigarette of claim 10, wherein, the battery assembly further includes a control module; the control module is configured for controlling the battery to supply power to the atomization assembly to atomize smoke oil in the atomization assembly in a normal working status, and the control module is further configured for controlling the battery to stop supplying power to the atomization assembly in a charging status; and the control module includes a first electric line electrically connected with the first charging electrode and a first battery electrode terminal electrically connected with the first battery electrode.

14. The electronic cigarette of claim 13, wherein, a first line hole is defined in the first charging electrode, the first electric line is inserted in the first line hole, and the first charging electrode is electrically connected with the control module via the first electric line; a second line hole is defined in the second charging electrode, and the second battery electrode includes a second electric line inserted in the second line hole and configured for electrically connecting the second charging electrode with the second battery electrode.

\* \* \* \* \*